(12) United States Patent
Nagao

(10) Patent No.: US 6,543,492 B1
(45) Date of Patent: Apr. 8, 2003

(54) OPEN-CLOSE MEANS FOR A FILL OPENING OF A FUEL TANK OF A VEHICLE, AND A FUEL FILLING METHOD USING THE OPEN-CLOSE MEANS

(76) Inventor: Takeshi Nagao, T762-0021 Nishinosho-cho 1010-1, Sakaide-shi, Kagawa (JP)

( * ) Notice: Subject to any disclaimer, the term of this patent is extended or adjusted under 35 U.S.C. 154(b) by 0 days.

(21) Appl. No.: 09/984,012

(22) Filed: Oct. 26, 2001

(51) Int. Cl.⁷ .................................................. B65B 1/04
(52) U.S. Cl. ...................... 141/94; 141/392; 141/301; 220/86.2
(58) Field of Search ............................. 141/192, 198, 141/94, 392, 301, 349, 350; 220/86.2

(56) References Cited

U.S. PATENT DOCUMENTS

| | | | |
|---|---|---|---|
| 3,642,036 A | * 2/1972 | Ginsburgh et al. | 141/284 |
| 4,934,419 A | * 6/1990 | Lamont et al. | 141/311 R |
| 5,383,500 A | * 1/1995 | Dwars et al. | 141/192 |
| 5,628,351 A | * 5/1997 | Ramsey et al. | 137/234.6 |
| 6,250,347 B1 | * 6/2001 | Tatsuno | 141/104 |

* cited by examiner

*Primary Examiner*—Steven O. Douglas
(74) *Attorney, Agent, or Firm*—Stevens, Davis, Miller & Mosher, LLP

(57) ABSTRACT

The invention relates to open-close means for a fill opening of a fuel tank of a vehicle that enables the fill opening of the fuel tank to be easily detected by a fuel filling robot. The open-close means comprises an open-close portion for opening and closing the fill opening and a position identifying member. Also, the invention relates to a fuel filling method using the open-close means, wherein the fuel filling robot is provided with a fuel nozzle and moving means for moving the fuel nozzle so that the fuel nozzle can be operated to move into position of the fill opening under control of signals from the position identifying member of the open-close means.

2 Claims, 1 Drawing Sheet

OPEN-CLOSE MEANS FOR A FILL OPENING OF A FUEL TANK OF A VEHICLE, AND A FUEL FILLING METHOD USING THE OPEN-CLOSE MEANS

BACKGROUND OF THE INVENTION

1. Field of the Invention

The invention relates to open-close means for a fill opening of a fuel tank of a vehicle such as an automobile, and to a fuel filling method using the open-close means.

2. Description of Background Art

Recently, a self-service fuel filling system for enabling a user to fill fuel in the fuel tank of the vehicle by himself/herself has been introduced to dispense with a filling-station attendant and cut fueling costs. The existing self-service fuel filling system, however, involves the drawback that a user must handle or operate the fuel nozzle by himself/herself, so that there is the possibility that a fuel spill may be caused.

Moreover, existing proposed automatic fuel filling systems need a means to strictly position the vehicle and data for the position of the supply portion of a fuel tank for every type of car or other vehicle. Also, the vehicle needs a special recognition means for sending data from the car or other vehicle to the fuel filling robot. For this reason, the spread of automatic oil supply equipment for cars or other vehicles does not progress.

It is the object of the invention to facilitate introduction of a fuel filling robot (or a fuel dispensing robot) by using an open-close mean for fill opening of a fuel tank with a position identifying mean which is a transmitter having a solar battery mounted on open-close portion of the fuel tank.

SUMMARY OF THE INVENTION

To accomplish the object above, the invention provides a novel open-close means for a fill opening of a fuel tank of a vehicle. Open-close means for a fill opening of a fuel tank of a vehicle comprising an open-close portion for opening and closing the fill opening and a position identifying member which is a transmitter having a solar battery and is integrally mounted to the open-close portion.

According to the invention, when a fuel filling robot introduced is provided with any suitable detecting means for detecting the position identifying member, the fuel filling robot comes to detect the position identifying means to bring its fuel nozzle into place of the fuel opening of the fuel tank of the vehicle. This enables the fuel to be filled in the fuel tank, irrespective of type of motor vehicle, and as such can facilitate the introduction of the fuel filling robots into a fuel station (a self-service gas station, in particular).

Preferably, a transmitter having a solar battery is used as the position identifying member. This can provide the advantage that the signals can be output from the transmitter without any additional power source.

The position identifying member may be integrally mounted to the open-close portion. This can provide the advantage that the existing open-close means for the fill opening (i.e., the fill cap on the fill opening) can be applied to the fuel filling robot with ease by simply replacing it with the open-close means having the position identifying means of the invention.

Also, the invention is directed to a novel fuel filling method using the open-close means having the position identifying member.

According to the fuel filling method using the open-close means of the invention, when a driver stops the vehicle at a specified position in a gas station or a self-service gas station and opens a fill opening cover, the fuel filling robot with detecting means automatically detects the position identifying member at the fill opening of the fuel tank of the vehicle to bring the fuel nozzle into position of the fill opening and also move it into the fill opening. In association with the movement of the fuel nozzle into the fill opening, the open-close means is actuated to open to commence the automatic fuel filling and, after completion of the filling of fuel, the fuel nozzle is retracted from the fill opening and the open-close means is closed. This can eliminate the need for a user to handle the self-service gasoline pump and the fuel nozzle, such that the fuel is filled in the fuel tank in safety and reliably.

DETAILED DESCRIPTION OF A PREFERRED EMBODIMENT

In the following, a preferred embodiment of open-close means for a fill opening of a fuel tank of a vehicle of the invention will be described with reference to the accompanying drawings.

Figure 1:
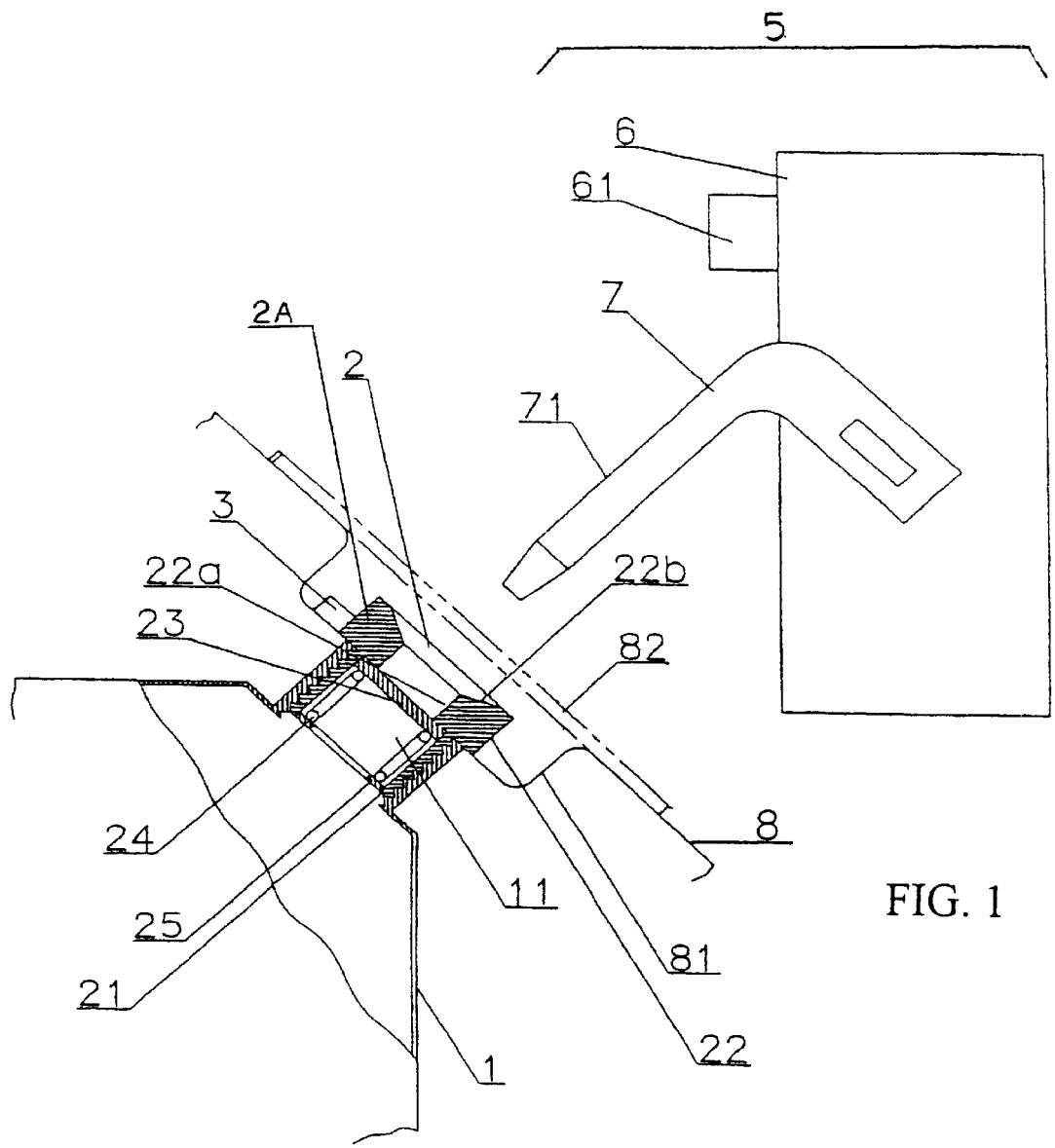
FIG. 1 is a sectional view of an embodiment of open-close means for a fill opening of a fuel tank of a vehicle according to the invention.

In FIG. 1, there is shown open-close means 2 that is fitted to a fill opening 11 of a fuel tank 1 of an automobile to be automatically opened and closed. The open-close means 2 has an open-close portion 2A including a threaded cylinder 21 threadedly engageable with the fill opening 11 and a flange 22 that is brought into abutment with a periphery of the fill opening 11 when the threaded cylinder 21 is screwed in the fill opening. The threaded cylinder 21 has in its interior a valve member 23 and a pressing spring 24 to press the valve member 23 against an inner surface of the flange 22 to always keep an opening portion of the fill opening 11 closed.

The flange 22 has an insertion hole 22a formed in a center portion thereof into which a fuel nozzle (mentioned later) is inserted. It also has a guide surface 22b which is formed to extend from around the periphery of the insertion hole 22a to an outside marginal portion of the flange 22, so as to guidedly introduce the fuel nozzle from the insertion hole 22a to the fill opening 11. The pressing spring 24 has an end on the opposite side to the valve member 23, which end is supported by a radially extending supporting leg 25 provided at an end portion of the threaded cylinder 21.

Figure 2:
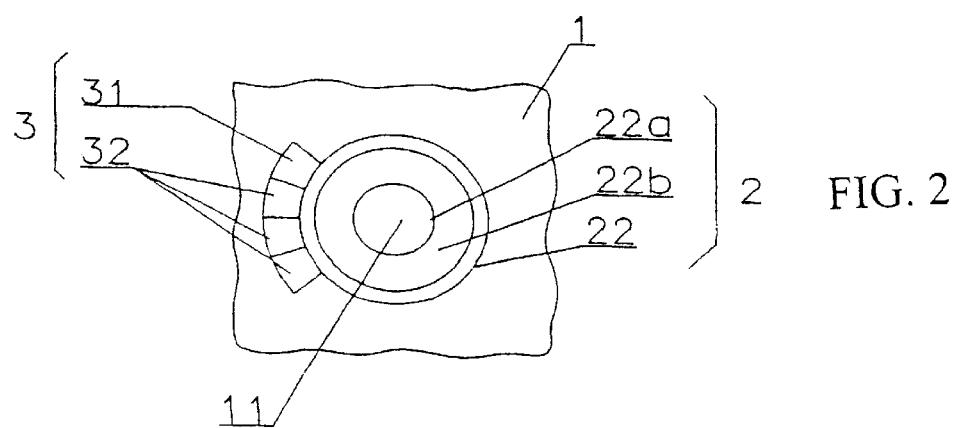
FIG. 2 is an enlarged front view of the open-close means of the embodiment of the invention.

The open-close means 2 has a position identifying member 3 integrally mounted around the flange 22 of the open-close portion 2A of the open-close means 2, as shown in FIG. 2. The position identifying member 3 comprises a transmitter 31 and a solar battery 32 serving as a driving source of the transmitter.

On the other hand, a fuel filling device (a fuel filling robot 5) having a fuel nozzle 7 and moving means 6 for moving the fuel nozzle 7 is disposed in a gas station. The moving means 6 comprises a moving mechanism (not shown) for moving the fuel nozzle 7 in a three-dimensional manner, a receiving portion 61 for receiving signals from the transmitter 31 of the position identifying member 3, and a computing portion (not shown) for calculating the position of the fill opening 11 under the signals from the receiving portion 61 and outputting to the moving mechanism the actuating signals to bring the fuel nozzle 7 into position of the fill opening 11. When the solar battery 32 detects light, it activates the transmitter 31, such that the transmitter 31 generates a signal. It is this signal which is processed by the computing portion to calculate the position of the fill opening 11. For example, the computing portion may simply utilize the intensity of the signal from the transmitter 31, whereby as the fuel nozzle 7 approaches the fill opening 11, the intensity of the signal from the transmitter 31 will change. Either or both of an end portion of the fuel nozzle 7 and a portion of the valve member 23 except its abutting portion to abut with the flange 22 has/have a flowing portion (not shown) via which the fuel fed from the fuel nozzle 7 is introduced into the fuel tank 1. The flowing portion formed in the portion of the valve member 23 except the abutting portion can permit the fuel to be fed from the fuel nozzle 7 into the fuel tank 1 via the flowing portion without causing any fuel spill.

In the embodiment of FIG. 1, the fill opening 11 is arranged in a cavity 81 in an automobile body 8, and a fill cap cover 82 is attached to the cavity 81 in a freely opening and closing manner. Also, there is provided closing means (not shown) for detecting the completion of the fuel filling work and then closing the cover 82 mechanically. Additionally, there is provided an O-ring (not shown) at an end 71 of the fuel nozzle 7 to prevent a fuel spill. Further, the position identifying member 3 is constructed to change e.g. a frequency in accordance with each kind of fuel. The fuel nozzle 7 and the fill opening 11 are changed in shape for each kind of fuel.

Now, the open-close means for the fill opening of the fuel tank of the vehicle and the fuel filling system using the open-close means will be described below.

When a driver stops the automobile at a specified position in a gas station and opens the fill cap cover 82, the solar battery 32 of the position identifying member 3 is exposed to light and then the transmitter 31 starts outputting signals. The signals are received by the receiving portion 61 of the moving means 6 of the fuel filling robot 5. Then, the computing portion and the moving mechanism of the fuel filling robot 5 are operated under control of the signals to move the fuel nozzle 7 into position of the fill opening 11. Further, the fuel nozzle 7 is inserted into the fill opening 11 from the insertion hole 22a, while it is guided by the guide surface 22b of the flange 22. The fuel nozzle 7, when inserted, pushes down the valve member 23 against a spring force of the pressing spring 24, so that a given amount of fuel is fed from the fuel nozzle 7 into the interior of the fuel tank 1. After completion of the filling of the fuel, the moving means 6 is actuated to retract the fuel nozzle 7 from the fill opening 11 to its original position. Then, the fill cap cover 82 is closed. The fuel filling work is ended with this.

As mentioned above, in the embodiment of the invention, the open-close means 2 for the fill opening 11 is provided with the position identifying member 3 so that the moving means 6 of the fuel filling robot 5 can be operated to move the fuel nozzle 7 into position of the fill opening 11 under control of the signals from the position identifying member 3. This can provide the result that the fuel filling robot 5 can be introduced with ease and also can be widely applied, irrespective of type of motor vehicle. In addition, since the open-close means 2 is designed to be opened and closed in association with the movement of the fuel nozzle 7, the open-close means 2 can be automatically opened and closed with ease and, besides, the fill cap cover 82 can also be automatically opened and closed by the movement of the closing means. Further, since the position identifying member 3 is changed in constitution in accordance with the kind of fuel, a possible mistake of selecting different fuel can be prevented. Additionally, since the fill opening 11 and the fuel nozzle 7 are changed in shape in accordance with the kind of fuel, a possible mistake of filling different fuel can be prevented.

This constitution of the invention can provide a significantly improved safety when the user uses the self-service fuel filling system.

Further, in the embodiment of the invention, since the position identifying member 3 is integrally mounted to the open-close portion 2A of the open-close means 2, the existing open-close means 2 (the fill cap) can be applied to the fuel filling robot with ease by simply replacing it with the open-close means having the position identifying means of the invention.

It should be noted that a light emitting device for emitting e.g. a specified color may be used as the position identifying member 3, without limiting to the transmitter 31 for transmitting various kinds of electromagnetic waves. In this variant using the light emitting device as the position identifying member 3, the moving means 6 of the fuel filling robot 5 is provided with the receiving portion 61 comprising a photodetector. In addition, a colored member and a shaped member may also be used as the position identifying member. In this variant, a CCD camera and the like capable of detecting the colored member or the shaped member is provided at the fuel filling robot 5 side. Further, the position identifying member may be modified to be formed separately from the open-close means 2 and arranged around the fill opening 11.

While the illustrative examples of the invention are provided in the above description, such is for illustrative purpose only and it is not to be construed restrictively. Modification and variation of the invention that will be obvious to those skilled in the art is to be covered in the following claims.

What is claimed is:

1. Open-close means for a fill opening of a fuel tank of a vehicle comprising an open-close portion for opening and closing the fill opening and a position identifying member, wherein the position identifying member comprises a transmitter having a solar battery integrally mounted to the open-close portion.

2. The open-close means of claim 1, wherein the position identifying member is the transmitter having the solar battery integrally mounted to the open-close portion.

* * * * *